(12) United States Patent
Willemin et al.

(10) Patent No.: US 7,295,183 B2
(45) Date of Patent: Nov. 13, 2007

(54) EXTENSION OF BATTERY LIFE IN A BATTERY-POWERED OPTICAL POINTING DEVICE

(75) Inventors: Michel Willemin, Lignières (CH);
André Grandjean, Cressier (CH);
Marc Degrauwe, Chez-le-Bart (CH);
James Harold Lauffenburger, Colorado Springs, CO (US)

(73) Assignee: EM Microelectronic-Marin SA, Marin (CH)

( * ) Notice: Subject to any disclaimer, the term of this patent is extended or adjusted under 35 U.S.C. 154(b) by 549 days.

(21) Appl. No.: 10/795,443

(22) Filed: Mar. 9, 2004

(65) Prior Publication Data

US 2005/0200606 A1   Sep. 15, 2005

(51) Int. Cl.
*G09G 5/00* (2006.01)
(52) U.S. Cl. ............... 345/156; 345/179; 345/4; 345/5; 345/8
(58) Field of Classification Search ......... 345/163, 345/157, 8, 166, 7, 5, 4, 156, 146, 158, 161, 345/179, 818; 713/300; 356/498; 455/566, 455/574; 348/220.1, 155; 715/784; 434/19
See application file for complete search history.

(56) References Cited

U.S. PATENT DOCUMENTS

| | | | | |
|---|---|---|---|---|
| 5,654,740 A * | 8/1997 | Schulha | ............. | 345/156 |
| 5,825,413 A * | 10/1998 | Mullis | ............. | 348/155 |
| 6,172,657 B1 * | 1/2001 | Kamakura et al. | ............. | 345/8 |
| 6,273,394 B1 * | 8/2001 | Vincent et al. | ............. | 251/129.04 |
| 6,323,899 B1 * | 11/2001 | Roberts et al. | ............. | 348/220.1 |
| 6,330,009 B1 * | 12/2001 | Murasaki et al. | ............. | 715/784 |
| 6,463,305 B1 * | 10/2002 | Crane | ............. | 455/566 |
| 6,697,953 B1 | 2/2004 | Collins | | |
| 7,061,468 B2 * | 6/2006 | Tiphane et al. | ............. | 345/158 |
| 7,116,427 B2 * | 10/2006 | Baney et al. | ............. | 356/498 |
| 2002/0185617 A1 | 12/2002 | Oliver et al. | | |
| 2003/0158609 A1 | 8/2003 | Chiu | | |
| 2004/0029080 A1 * | 2/2004 | Healy et al. | ............. | 434/19 |
| 2004/0130532 A1 * | 7/2004 | Gordon et al. | ............. | 345/166 |
| 2005/0104853 A1 * | 5/2005 | Sitalasai et al. | ............. | 345/163 |
| 2005/0168438 A1 * | 8/2005 | Casebolt et al. | ............. | 345/156 |

FOREIGN PATENT DOCUMENTS

| | | |
|---|---|---|
| DE | 101 55 044 A1 | 8/2002 |
| EP | 1 291 810 A2 | 3/2003 |
| WO | WO 95/14286 A1 | 5/1995 |

* cited by examiner

*Primary Examiner*—Prabodh Dharia
(74) *Attorney, Agent, or Firm*—Sughrue Mion, PLLC

(57) ABSTRACT

A method for extending battery life in an optical pointing device powered by one or more battery cells (30), the optical pointing device including an optical motion sensing device (10) for tracking motion with respect to a surface (S) and comprising motion sensing circuitry (12) coupled to an optical sensor (15) and at least one light source (14) for illuminating a portion of the surface. The method comprises the steps of (i) monitoring the power output of the said one or more battery cells (30), (ii) detecting when the said power output falls below a certain threshold indicative of a low battery status (EOL) and (iii) upon detection of the low battery status, switching the optical pointing device into a low power consumption mode where power consumption of the optical pointing device is reduced and performance of the optical motion sensing device is partially degraded. An optical pointing device implementing this method.

21 Claims, 1 Drawing Sheet

EXTENSION OF BATTERY LIFE IN A BATTERY-POWERED OPTICAL POINTING DEVICE

REFERENCE TO RELATED PATENT APPLICATIONS

In the following reference will be made to the following three U.S. patent applications, all filed on Jul. 1, 2003: U.S. application Ser. No. 10/609,676 entitled "Displacement data post-processing and reporting in an optical pointing device"; U.S. application Ser. No. 10/609,686 entitled "Method and system for optimizing illumination power and integration time in an optical sensing device"; and U.S. application Ser. No. 10/609,687 entitled "Method of operating an optical motion sensing device and optical motion sensing device implementing this method". All three patent applications have the same inventors: James Harold Lauffenburger, Gil Afriat and Robert R. Rotzoll, and are assigned to EM Microelectronic-Marin SA (Switzerland). These three patent applications describe various mechanisms relating to the operation of optical motion sensing devices and optical pointing devices, which mechanisms might advantageously be implemented in the embodiments described below. Accordingly, the above three patent applications are incorporated herein by reference.

1. Field of the Invention

The present invention generally relates to optical pointing devices (such as optical mice used for controlling the position of a cursor on a computer screen), i.e. pointing devices that comprise an optical motion sensing circuit for optically tracking motion relative to a surface. The present invention more particularly relates to battery-powered optical pointing devices, i.e. pointing devices that are energized by an autonomous power supply composed of one or more battery cells.

2. Background of the Invention

Optical pointing devices are already known in the art. U.S. Pat. No. 5,288,993 for instance discloses a cursor pointing device utilizing a photodetector array and an illuminated target ball having randomly distributed speckles (i.e. a so-called trackball). U.S. Pat. No. 5,703,356 (related to the above-mentioned U.S. Pat. No. 5,288,993) further discloses (in reference to FIGS. 23A and 23B of this document) an optical cursor pointing device in the form of a mouse which does not require a ball and wherein light is reflected directly from the surface over which the pointing device is moved.

In both cases, the optical pointing device includes a light source for repetitively illuminating a surface portion (i.e. a portion of the surface of the ball or a portion of the surface over which the optical pointing device is moved) with radiation and an optical sensing unit comprising a photodetector array including a plurality of pixels each having a photosensitive element which is responsive to radiation reflected from the illuminated surface portion. The pixels outputs of the photodetector array are typically coupled to conditioning and processing circuits for tracking and extracting information about the relative motion between the sensing unit and the illuminated surface portion.

Cordless or wireless versions of such optical pointing devices can now be found on the market. The power supply of such cordless or wireless optical pointing device is typically ensured by one or more battery cells which can be of a non-rechargeable or rechargeable type (typically two or three 1.5 V battery cells of types AA/LR6 or AAA/LR3). One major limitation of these battery cells resides in their relatively short life. In cordless optical pointing device currently found on the market, battery life typically ranges from one to about six months, this duration depending on multiple factors including (i) frequency and amount of usage of the pointing device, (ii) the type and color of the surface used as reference for motion detection and (iii) the type and current capacity of the battery cells used.

As long as the power output of the battery cells is sufficiently high, a reliable operation of the pointing device can be ensured. When the battery cells near the end of their life, power output declines rapidly and the pointing device ultimately fails to function. It is thus common to provide the pointing device with means for monitoring the power output of the battery cell or cells and detecting when this power output falls below a certain threshold so as to inform the user of the low battery status (or end-of-life status). Upon detection of this low battery status, the user is invited to replace (or recharge) the battery cells before ultimate failure thereof.

As already mentioned above, the power output of the battery cells declines very rapidly when the cells near the end of their life. Therefore, despite being informed of the low battery status, the user can still be confronted to a situation where he or she does not have the ability or time to replace or recharge the battery cells before complete failure of the pointing device. A solution to this problem may consist in informing the user about the low battery status at an earlier stage, but this has as a consequence that the user might replace or recharge the battery cells at a stage where they can still be exploited in a satisfying manner to supply power to the pointing device. There thus exists a need to find a solution which allows to exploit the battery cells in an optimal manner (i.e. almost up to the end of their life) and nevertheless ensure that the user is offered sufficient time to replace or recharge the almost dead battery cells before experiencing complete failure of the pointing device.

SUMMARY OF THE INVENTION

According to a first aspect of the invention, there is provided a method for extending battery life in an optical pointing device powered by one or more battery cells, the optical pointing device including an optical motion sensing device for tracking motion with respect to a surface and comprising motion sensing circuitry coupled to an optical sensor and at least one light source for illuminating a portion of the surface, the method comprising the steps of:

a) monitoring power output of the said one or more battery cells;

b) detecting when the said power output falls below a certain threshold indicative of a low battery status;

c) upon detection of the said low battery status, switching the optical pointing device into a low power consumption mode where power consumption of the optical pointing device is reduced and performance of the optical motion sensing device is partially degraded.

According to a second aspect of the invention, there is also provided an optical pointing device (such as a mouse, trackball, etc.) for implementing the above method.

Substantial power savings can be achieved by partially "degrading" the performance of the optical motion sensing device. This can be achieved in various ways. Preferably, the switching of the optical pointing device into the low power consumption mode is performed thanks to at least one of the following operations:

reducing power output of the light source, thereby degrading the performance of the optical motion sensing device on surfaces having a low reflectivity; and/or reducing a flash rate at which the optical motion sensing device is activated, thereby degrading the performance of the optical motion sensing device for high speed and/or high acceleration movements.

It is important to stress that the partial degradation in performance only affects a limited number of usage situations. The optical pointing device will still operate with full performance for certain types of surfaces, and/or under certain speed and acceleration conditions. In particular, reducing the light source power and/or the flash rate will merely reduce the pointing device's operating range in terms of usable types of surfaces and/or in terms of upper displacement speed and acceleration limits. This does not represent a real problem for the user. Let us assume that the pointing device is an optical mouse and that the user normally uses his or her optical mouse on a dark surface having a low reflectivity, the reduced performance may be compensated for by using the optical mouse on a bright sheet of paper, for instance. Similarly, the reduced performance in terms of detectable displacement speed and acceleration will only affect a limited number of applications which require high speed and high acceleration detection capability, such as gaming applications.

Other advantageous embodiments of the method may be envisaged. For instance, in addition to acting on the optical motion sensing device, other components of the pointing device that are not directly used for tracking motion with respect to the surface (such as a wireless transmitter or actuator device) could be switched into a low power consumption mode or even completely switched off for the purpose of saving power. In particular, some optical mice are provided with so-called "rollers" that are actuated by a finger. Those rollers are typically constituted of a wheel mounted about an axle which drives an optical encoding wheel into rotation (cf. for instance document U.S. Pat. No. 5,912,611 for a description of such an actuator device). Upon detection of the low battery status, the circuitry associated with the roller (in particular the light source used for illuminating the optical encoding wheel and the photodetector used for detecting the resulting encoded light pattern) could simply be switched off. Again, rollers are provided for comfort purposes and disabling such an actuator device will not greatly affect operation of the pointing device as a whole.

In case the pointing device is provided with a wireless transmitter (such as an RF—e.g. Bluetooth™—, optical, acoustic or inductive transmitter), this transmitter could be switched into a low power consumption mode where communication with an external receiver is still possible, but with a shorter transmission range.

Other aspects, features and advantages of the present invention will be apparent upon reading the following detailed description of non-limiting examples and embodiments made with reference to the accompanying drawing.

DETAILED DESCRIPTION OF THE INVENTION

Figure 1:
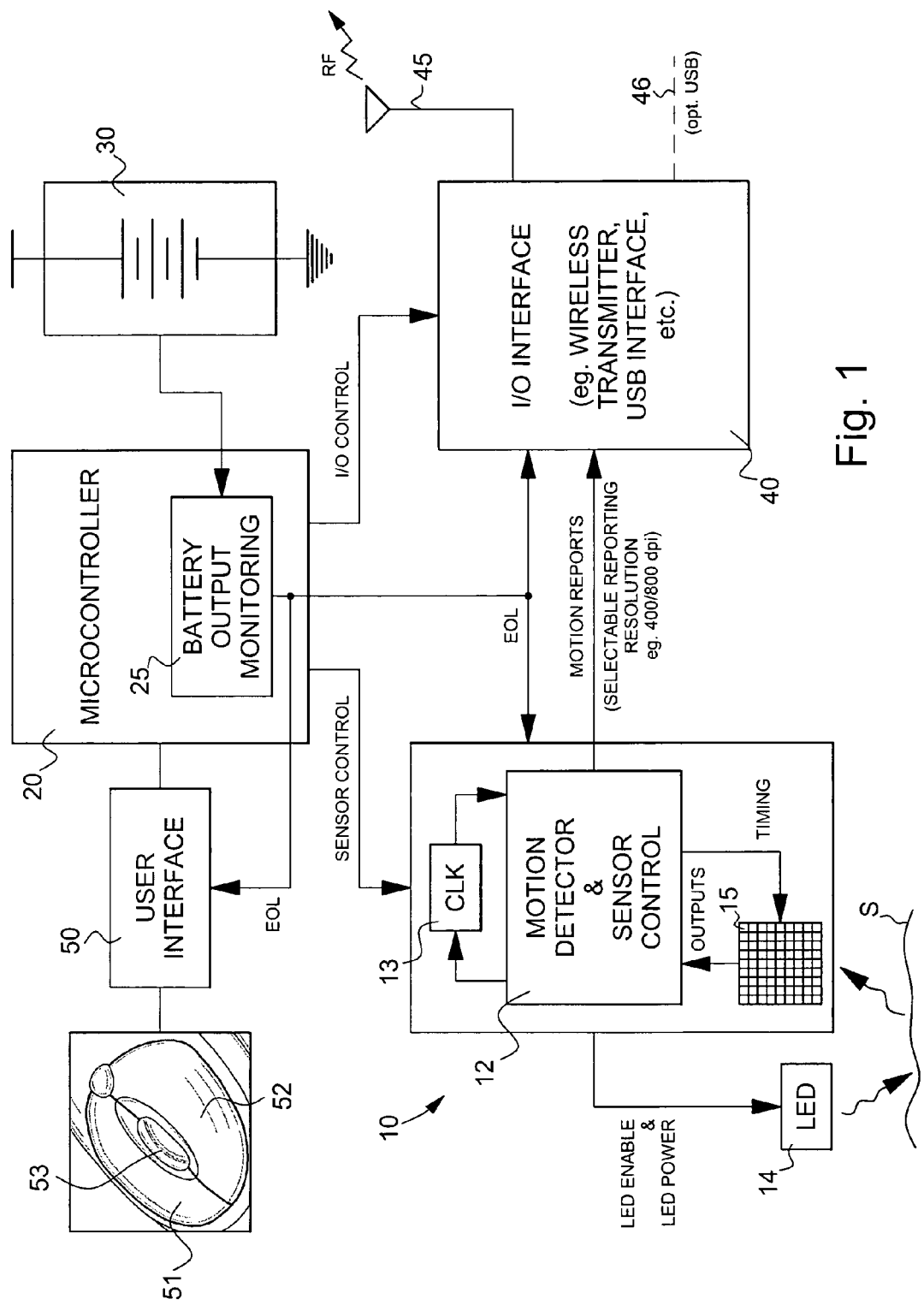
FIG. 1 is a block diagram illustrating a possible implementation of the method for extending the battery life in a battery-powered optical pointing device.

FIG. 1 illustrates the main functional blocks of a battery-powered optical mouse which implements a mechanism for extending the battery life according to the present invention. The optical mouse comprises (as this is the case for most optical pointing device already available on the market) an optical motion sensing device 10, typically in the form of an integrated circuit, for tracking motion with respect to a surface S, a controlling unit 20, such as a micro-controller, for controlling operation of the different functional blocks of the mouse (including, but not only, the optical motion sensing device 10), a battery 30 (which may be constituted of one or more battery cells, whether rechargeable or not), an input/output interface 40 for communicating with the outside world (i.e. with a computer or any other host) and a user interface 50 comprising various types of actuator devices, including, in a not limiting manner, two buttons 51, 52 and a roller (or wheel) 53 mounted on the upper part of the mouse's housing. A description of a roller for a mouse may be found in document U.S. Pat. No. 5,912,611 already mentioned before.

For the purpose of simplification, controlling unit 20 is shown as controlling the optical motion sensing device 10 and I/O interface 40 over corresponding control lines or interfaces designated respectively by designation "SENSOR CONTROL" and "I/O CONTROL" respectively. It may of course be envisaged that blocks 10, 20, 40 (and others) share a common interface or bus.

It should be stressed that the mouse illustrated schematically in FIG. 1 only constitutes one possible implementation of the invention. Other types of optical pointing device might be envisaged, such as optical trackballs or optical pens for instance, without departing from the scope of the annexed claims.

The optical motion sensing device 10 can be any known device that can detect, track, measure and report motion by optically examining the texture of a portion of the surface S and digitally deriving information representing magnitude and direction of displacement. It basically comprises motion sensing circuitry 12 coupled to an optical sensor 15 and at least one light source 14. The optical sensor 15 typically consists of an array of multiple photodetectors (designated hereafter as "pixels"), such as photodiodes, the outputs of which are fed to motion sensing circuitry 12, timing of the optical sensor 15 (in particular for performing analog-to-digital signal conversion within each of the pixels) being ensured by motion sensing circuitry 12. The light source 14 is typically formed of a LED (such as red or infrared LED, or any other source of illumination whether in the visible or invisible spectrum). A clock circuit 13 providing the required signals for clocking the operations of the optical motion sensing device is here shown as being incorporated within the optical motion sensing device 10. This clock circuit 13 and clock signals may alternatively be provided externally, for instance in/by the micro-controller 20.

Power output of the light source or LED 14 can advantageously be adjusted, in particular as a function of the type of surface used as reference for motion detection. Such a mechanism for adjusting the power of the light source is for instance disclosed in U.S. patent application Ser. No. 10/609,686 mentioned in the preamble and which is incorporated herein by reference as already indicated.

Various optical motion sensing devices are known in the art. One may for instance refer to U.S. Pat. Nos. 5,288,993 and 5,703,356 (already mentioned in the preamble) in the name of Logitech and to PCT Application No. WO 03/049018 A1 in the name of EM Microelectronic-Marin SA, which latter application describes an improved motion detection technique particularly adapted for optical mouse applications. The techniques described in the above documents follow a common approach and basically consist of extracting so-called "edge" information in a sample image (i.e. spatial intensity differences between pixels) and comparing this information, or information derived thereof, with information extracted from another sample image taken at a subsequent point in time.

Another approach is also known from U.S. Pat. Nos. 5,578,813 and 5,644,139 (and related patents) and consists of correlating shifted versions of a reference image frame constituted of digitized pixel output values with a sample image frame of digitized pixel output values taken at a different point in time, thereby deriving a set of correlation values that are indicative of the magnitude and direction of displacement (the direction and magnitude of displacement being indicated by a correlation peak among the derived correlation values).

In both of the above approaches, the optical motion sensing device basically takes two images of a portion of the surface at two different points in time and computes an indication of the magnitude and direction of displacement between the two images, which magnitude and direction of displacement are reported through I/O interface 40 (either in a wired or wireless manner). In the following, this step will be designated by the term "flash". This flash operation is repeated at a certain rate, or "flash rate", which can either be fixed or adjusted as a function of different parameters. A flash rate adjustment mechanism is for instance proposed in U.S. patent application Ser. No. 10/609,687 mentioned in the preamble and which is also incorporated herein by reference.

Typically, the flash rate (i.e. the rate at which the optical motion sensing device 10 is activated) is substantially greater than the rate, or "reporting rate", at which motion is reported to the computer. Illustratively, the flash rate and reporting rate can be of the order of 10 to 20 kHz and 100 Hz respectively. Accordingly, the optical motion sensing device 10 commonly implements an accumulation scheme allowing it to accumulate individual motion counts between each report to the computer.

Motion is generally reported to the computer at a determined reporting resolution, commonly measured in "digits" or "dots per inch" or dpi. Pointing devices available on the market typically output motion reports with a resolution of 400 dpi or 800 dpi, a high reporting resolution providing for a more "sensitive" behaviour. Again, the pointing device may implement a mechanism for selecting the desired output resolution, as well as a mechanism for adjusting or selecting the reporting rate. Such a selection mechanism is for instance disclosed in U.S. patent application Ser. No. 10/609,676 mentioned in the preamble and which, again, is incorporated herein by reference.

I/O interface 40 is preferably of the wireless type (such as an RF—e.g. Bluetooth™—, optical, acoustic or inductive transmitter). In FIG. 1, I/O interface 40 is for instance illustrated as being coupled to an RF antenna 45. I/O interface 40 may nevertheless be adapted to connect the pointing device to the computer by means of a cable (such as PS/2 or USB cable).

One will now turn to the description of various embodiments of mechanisms for extending the battery life of a battery-powered optical pointing device as illustrated in FIG. 1. As already mentioned in the preamble, batteries typically exhibit an abruptly declining power output curve when one nears the end of their life. Saving power at this particular moment of the life of the batteries is particularly desirable, since it will give the user "extra" time to perform required tasks before replacing or recharging the batteries.

The underlying principle of the present invention is to provide means for detecting when the battery 30 nears the end of its life and for switching the pointing device into a low power consumption mode where power consumption of the pointing device is reduced and performance of the optical motion sensing device 10 (which device basically constitutes the greatest power consuming part of the pointing device) is partially degraded. In short, one gains some more usage time by saving power to the detriment of a slight degradation in the performance of the optical motion sensing device 10.

Detection of the nearing end of life of the battery 30 can be performed by providing battery monitoring means for detecting when the power output of the battery 30 (in terms of current and/or voltage output) falls below a certain threshold, or "EOL ("End Of Life") threshold". Such means are designated in FIG. 1 by reference numeral 25. Battery monitoring means 25 may be constructed in any suitable manner so as to monitor the battery output and provide a low battery status indication (signal EOL in FIG. 1) when this output falls below the EOL threshold. Further, this battery monitoring mechanism 25 may be implemented as an additional function of controlling unit 20, as illustrated, or alternatively as an integrated function of the power supply circuitry associated with battery 30, or even as a separate functional block. The essential goal of the battery monitoring means 25 is to provide a low battery status indication ("EOL") when battery 30 nears the end of its life. One should however choose an adequate setting of the EOL detection threshold so that the low battery status is detected at the optimal moment (not too early and not too late). Advantageously, the EOL detection threshold might be adjusted or selected as a function of the type of battery or batteries used.

Switching of the pointing device in low power consumption mode upon detection of the low battery status can be achieved by acting on different areas and operating parameters of the optical motion sensing device 10. Preferably, one acts on at least one of the following two main areas to save power:

(i) the power consumption of the light source 14 used to illuminate the surface which is exploited as reference for motion detection; and (ii) the rate at which the optical motion sensing device 10 is activated, i.e. the so-called flash rate.

One may also act on other areas of the pointing device to gain slightly more power as this will be described hereafter.

Let us firstly consider area (i). Provided that the pointing device includes a mechanism for adjusting the power output of the light source (as for instance proposed in U.S. patent application Ser. No. 10/609,986 which is incorporated herein by reference), one may extend the battery life of the pointing device by reducing the power output (i.e. power consumption) of the light source upon detection of the low battery status. This of course requires that the low battery status signal EOL be provided by the battery monitoring means 25 to the optical motion detection device 10, either over a separate line (as illustrated in FIG. 1) or through its interface with controlling unit 20 (i.e. over interface SENSOR CONTROL in FIG. 1 or over an interface or bus which is common to different functional blocks of the pointing device).

As a consequence of the reduced power output of the light source 14, performance of the optical motion sensing device 10 will be partially degraded on surfaces having a low reflectivity. In other words, the optical pointing device will not anymore operate adequately on dark surfaces. This can however be compensated for by the user by providing a brighter surface support for the pointing device, for instance by using a white sheet of paper underneath the mouse.

Let us now consider area (ii). Provided that the pointing device is provided with a mechanism for adjusting the flash rate, one may extend the battery life of the pointing device by reducing the said flash rate upon detection of the low battery status. One may achieve this using various approaches. One approach may advantageously consist of providing a flash rate control mechanism for adjusting the flash rate through selection of an adequate adjustment parameter. As mentioned hereinabove, such a mechanism is for instance proposed in U.S. patent application Ser. No. 10/609,687 which is incorporated herein by reference.

Another approach may consist in acting directly on the frequency output of the clock circuit (13 in FIG. 1) used for clocking operations of the optical motion sensing device. This can be done either by providing an oscillator circuit with controllable frequency output (such as a voltage controlled oscillator) or by providing a frequency divider on the oscillator output, the dividing ratio of which is selectable.

As a consequence of the reduced flash rate, performance of the optical motion sensing device 10 will be partially degraded for high speed and/or high acceleration movements. Basically, the reduced flash rate will lower the upper displacement speed limit above which the optical motion sensing device 10 cannot anymore keep track of motion, this being obviously due to the fact that time between two successive flashes gets bigger when lowering the flash rate. Again, this partial degradation of performance merely constitutes a problem for a limited number of applications which require high speed and high acceleration detection capability, such as gaming applications for instance.

Besides areas (i) and (ii) above, one may act on other areas to gain some extra power upon detection of the low battery status. One may for instance provide the pointing device with a mechanism for switching the reporting resolution of the optical motion sensing device between at least first and second reporting resolutions (for instance between 800 dpi and 400 dpi) and/or for adjusting or selecting the reporting rate, such a mechanism being for instance proposed in U.S. patent application Ser. No. 10/609,676 which is incorporated herein by reference. By switching from one reporting resolution to the other and/or from one reporting rate to the other, one may act in a positive manner on the power consumption of the pointing device.

In addition to acting on the optical motion sensing device, other components of the pointing device that are not directly used for tracking motion could be switched into a low power consumption mode or even completely switched off for the purpose of saving power upon detection of the low battery status.

Let us consider for example the I/O interface 40 which includes, in the illustration of FIG. 1, wireless transmission means comprising an RF transmitter (not illustrated) coupled to antenna 45. One may also save some power and extend battery life by switching the wireless transmission means into a low power consumption mode, for instance by reducing its transmission power. In this case, the performance of the pointing device will be partially degraded in the sense that the transmission range between the pointing device and receiver unit becomes shorter.

Let us now consider the user interface 50 and associated actuator devices 51, 52, 53. One or more of the actuator devices 51, 52, 53 (and corresponding circuitry) could also be switched into a low power consumption mode or even completely switched off upon detection of the low battery status. Significant power savings can for instance be expected from the complete switching off of the roller 53. Disabling roller 53 can indeed save about 25% of the power usage.

Lastly, in addition to switching the optical pointing device into a low power consumption mode as explained above, it might be desirable to inform the user of the low battery status and/or of the partial degradation in performance of the optical motion sensing device. It might also be desirable to let the user decide and select which of the functions of the optical pointing device should be switched into low power consumption mode upon detection of the low battery status.

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For instance, even if FIG. 1 illustrates an optical mouse, the invention could be applied to other types of optical pointing devices, such as optical trackballs or optical pens.

In addition, as already mentioned above, the battery cell or cells may be of the non-rechargeable or rechargeable type.

What is claimed is:

1. A method for extending battery life in an optical pointing device powered by one or more battery cells, said optical pointing device including an optical motion sensing device for tracking motion with respect to a surface and comprising motion sensing circuitry coupled to an optical sensor and at least one light source for illuminating a portion of said surface, the method comprising the steps of:
    a) monitoring power output of the said one or more battery cells;
    b) detecting when the said power output falls below a certain threshold indicative of a low battery status;
    c) upon detection of the said low battery status, switching said optical pointing device into a low power consumption mode where power consumption of the optical pointing device is reduced and performance of the optical motion sensing device is partially degraded by reducing a flash rate at which said optical motion sensing device is activated, thereby degrading the performance of the optical motion sensing device for high speed and/or high acceleration movements.

2. The method according to claim 1, wherein step c) includes reducing power output of said light source, thereby degrading the performance of the optical motion sensing device on surfaces having a low reflectivity.

3. The method according to claim 1, wherein reducing said flash rate includes one of the following:
    providing a flash rate control mechanism for adjusting said flash rate through selection of an adjustment parameter and adjusting the said adjustment parameter to lower said flash rate; or
    reducing a frequency output of a clock circuit used for clocking operations of said optical motion sensing device.

4. The method according to claim 1, wherein step c) includes switching between a high and a low reporting resolution and/or between a high and a low reporting rate upon detection of the low battery status.

5. The method according to claim 1, further including the step of informing a user of the low battery status and/or of the partial degradation of performance of the optical motion sensing device.

6. The method according to claim 1, wherein step c) further includes the switching into low power consumption mode or complete switching off of other components of the pointing device that are not directly used for tracking motion with respect to the surface.

7. The method according to claim 6, wherein the switching into low power consumption mode or complete switching off of the said other components includes at least one of the following:
   switching into low power consumption mode of wireless transmission means used for transmitting and/or receiving data to and/or from an external unit;
   switching into low power consumption mode or complete switching off of circuitry associated with at least one actuator device provided on the pointing device.

8. The method of claim 7, wherein said actuator device is a roller or wheel that can be driven into rotation by a finger and wherein the circuitry associated with said roller or wheel includes an optical encoding mechanism.

9. The method according to claim 1, wherein said optical pointing device is a computer mouse.

10. An optical pointing device powered by one or more battery cells, said optical pointing device including an optical motion sensing device for tracking motion with respect to a surface and comprising motion sensing circuitry coupled to an optical sensor and at least one light source for illuminating a portion of said surface,
   wherein said optical pointing device is further provided with battery monitoring means for monitoring power output of the said one or more battery cells and for detecting when the said power output falls below a certain threshold indicative of a low battery status,
   said battery monitoring means being adapted to switch the optical pointing device, upon detection of the said low battery status, into a low power consumption mode where power consumption of the optical pointing device is reduced and performance of the optical motion sensing device is partially degraded,
   wherein said optical pointing device further comprises flash rate control means for adjusting a flash rate at which said optical motion sensing device is activated, said flash rate control means reducing said flash rate upon detection of said low battery status by said battery monitoring means, thereby degrading the performance of the optical motion sensing device for high speed and/or high acceleration movements.

11. The optical pointing device according to claim 10, further comprising light source control means for adjusting power output of said light source, said light source control means reducing the power output of the light source upon detection of said low battery status by said battery monitoring means, thereby degrading the performance of the optical motion sensing device on surfaces having a low reflectivity.

12. The optical pointing device according to claim 10, wherein said flash rate control means includes one of the following:
   means for adjusting an adjustment parameter conditioning said flash rate and wherein, upon detection of said low battery status by said battery monitoring means, said adjustment parameter is adjusted to lower said flash rate; or
   means for adjusting a frequency output of a clock circuit used for clocking operations of said optical motion sensing device.

13. The optical pointing device according to claim 10, further comprising means for switching between a high and a low reporting resolution and/or between a high and a low reporting rate upon detection of the low battery status.

14. The optical pointing device according to claim 10, further comprising means for performing the switching into low power consumption mode, upon detection of the low battery status, of wireless transmission means used for transmitting and/or receiving data to and/or from an external unit.

15. The optical pointing device according to claim 10, further comprising means for performing the switching into low power consumption mode of or complete switching off, upon detection of the low battery status, of circuitry associated with at least one actuator device provided on the pointing device.

16. The optical pointing device of claim 15, wherein said actuator device is a roller or wheel that can be driven into rotation by a finger and wherein the circuitry associated with said roller or wheel includes an optical encoding mechanism.

17. The optical pointing device according to claim 10, wherein said optical pointing device is a computer mouse.

18. A method for extending battery life in an optical pointing device powered by one or more battery cells, said optical pointing device including an optical motion sensing device for tracking motion with respect to a surface and comprising motion sensing circuitry coupled to an optical sensor and at least one light source for illuminating a portion of said surface, the method comprising the steps of:
   a) monitoring power output of the said one or more battery cells;
   b) detecting when the said power output falls below a certain threshold indicative of a low battery status;
   c) upon detection of the said low battery status, switching said optical pointing device into a low power consumption mode where power consumption of the optical pointing device is reduced and performance of the optical pointing device is partially degraded by reducing a flash rate at which said optical motion sensing device is activated, thereby degrading the performance of the optical motion sensing device for high speed and/or high acceleration movements.

19. The method according to claim 18, wherein step c) includes reducing the power consumption and performance of the motion sensing device and/or switching into low power consumption or complete switching off of other components of the pointing device that are not directly used for tracking motion with respect to the surface.

20. The method according to claim 19, wherein the switching into low power consumption mode or complete switching off of the said other components includes at least one of the following:
   switching into low power consumption mode of wireless transmission means used for transmitting and/or receiving data to and/or from an external unit;
   switching into low power consumption mode or complete switching off of circuitry associated with at least one actuator device provided on the pointing device.

21. The method according to claim 18, wherein said optical pointing device is a computer mouse.

* * * * *